P. W. GATES.
Evaporating Pan.
No. 1,350. Reissued Oct. 28, 1862.
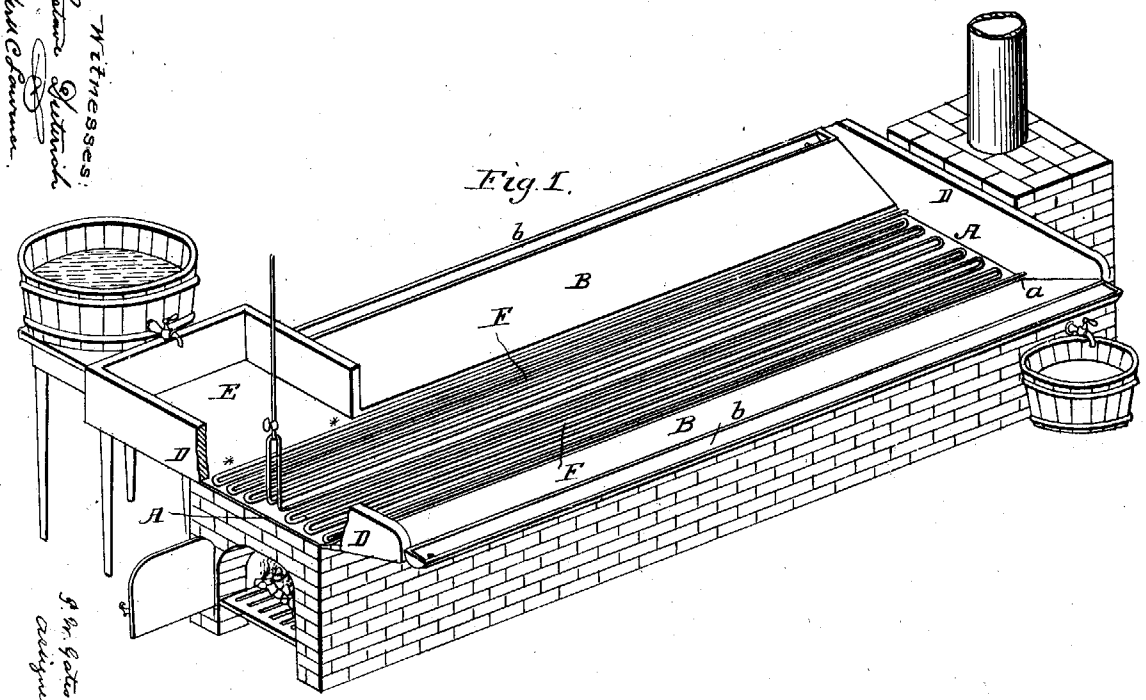
Witnesses:
Gustave Dieterich
Detlef C Lawrence
Inventor:
P. W. Gates. Thomas Chalmers & David R. Hyman
assignees of Wheeler Hodges & P. W. Gates
by Mason Fenwick & Lawrence
attys.
N. PETERS. Photo-Lithographer. Washington, D. C.

UNITED STATES PATENT OFFICE.

P. W. GATES, THOS. CHALMERS, AND DAVID R. FRASER, OF CHICAGO, ILLINOIS, ASSIGNEES, BY MESNE ASSIGNMENTS, OF WHEELER HEDGES, OF SAME PLACE.

IMPROVED EVAPORATING-PAN FOR SUGAR JUICES AND SOLUTIONS.

Specification forming part of Letters Patent No. 26,325, dated November 29, 1859; Reissue No. 1,250, dated October 28, 1862.

DIVISION No. 4.

*To all whom it may concern:*

Be it known that WHEELER HEDGES, of Chicago, in the county of Cook and State of Illinois, did invent a new and Improved Mode of Evaporating Sugar and Sirup Juices, for which, on the 29th day of November, 1859, Letters Patent were granted to WHEELER HEDGES and P. W. GATES, as assignees of his sole right, title, and interest therein, which Letters Patent were again assigned to P. W. GATES, THOMAS CHALMERS, and DAVID R. FRASER, of the city, county, and State above named; and we, the undersigned, assignees as aforesaid, believing that the said patent is inoperative and invalid by reason of a defective specification, which defect has arisen from inadvertence and mistake, do hereby surrender the same and file amended specifications, and request that new Letters Patent under divisions numbered 1, 2, 3, and 4 may be issued to us for the same invention for the residue of the period for which the original patent was granted, on the amended specifications, which, together with the accompanying drawings, we do hereby declare to be a more full, clear, and exact description of the said WHEELER HEDGES'S new and improved mode of evaporating sugar and sirup juices.

Figure 1 of the accompanying drawings is a perspective view of an evaporator-pan constructed in accordance with WHEELER HEDGES'S invention, the pan being shown mounted upon a fire-arch and with steam-coils on the upper surface of its bottom. Fig. 2 is a vertical cross-section of the same with steam-coils on the upper side of the bottom of the pan and a fire-arch under the same.

The same letters of reference of the two figures indicate corresponding parts.

The nature of the invention embraced under this patent consists in an evaporator-pan for evaporating sugar and sirup juices rapidly and in thin layers or streams, which is constructed with a shallow evaporating depth by having its bottom rise at its side edges on an incline plane, so as to form scum or foam beaches on very obtuse angles, while at its ends it rises vertically, or nearly so, the pan in its construction being proportioned on its bottom or horizontal surface with respect to the width of space to be occupied by steam-coils, which are to be placed in it for the purpose of evaporating the juices, or with respect to the width of the fire-arch over which it may be placed for the purpose of evaporating the juices, the proportion in either case being such that the coils do not require to be extended upon the obtuse-angle portions, nor the obtuse-angle portions to be exposed to the fire of the arch.

The invention also consists in the combination of this construction of pan and a laterally-located defecator, as hereinafter described.

To enable others skilled in the art to make and use this invention, we will proceed to describe the same with reference to the drawings.

A is the evaporating-pan, of any convenient size, preferably made with a flat bottom, about six times as long as it is wide. This bottom is of copper or other suitable material. The sides B B, which form a continuation of the bottom, so as to form very obtuse angles, may be about eighteen inches wide, and united to the bottom at their inner and lower edge. In practice the outer upper edge may be raised above the plane of the bottom, by means of an oblique set of the sides, about five inches, thus forming a flatly-flared depth to the pan in a lateral direction. These sides thus constructed serve as wide beaches for the scum or foam with feculent matter to deposit upon. The ends D D of the pan may be vertical and about five or six inches in depth or height. At the discharging end of the pan a let-off passage with a faucet or gate is provided, as shown at *a* in the drawings. If desired, the edges of the sides of the pan may have gutters *b b* placed under them, so that the scum may be scraped into them, and thus be saved for vinegar. These, however, are not essential. One of the sides of the pan might be vertical and the other inclined. In that case the steam would first pass along near the vertical side. In order to employ this pan in combination with a defecator, E, one of the sides may be cut away along a portion of its length, and the bottom of the pan extended laterally in width at that point, as shown. The defecator E has three of its sides inclosed by vertical boards or strips, so as to form a rectangular apartment, the plane of whose bottom is level with the bottom of the pan, and the discharge thereof into the pan is free and unobstructed, as represented at **. This defecator should be in size about the proportion with respect to the capacity of the pan shown.

The pan and defecator, when used on a fire-arch, as represented in Fig. 2, should be proportioned with respect to the width of the arch, so that the direct action of the flame shall not come upon them. However, it would be well to build the wall of the arch out under the defecator, so as to form a hot-air chamber, and when steam-coils F F, instead of flame or in connection with flame, are used to evaporate or aid in evaporating the juices the pan should be wide enough on its flat bottom to receive the proper length of coils without requiring the coils to extend up on the inclined sides or beaches.

From the foregoing description it will be seen that the defecator receives the juice first, and by reason of its remoteness from the direct action of flame it acts simply as a hot-air heating-chamber to heat the juice moderately or nearly to the boiling-point before it enters the cleansing-apartment of the pan. Thus an almost immediate and perfect defecation takes place. The green scum thus thrown up is prevented from flowing out of the defecator by a strong current of ebullition setting in in the cleansing and intensely-heated portion of the pan, and the operator is enabled to remove such scum before it is boiled into the sugar or sirup juice, thus avoiding the deleterious influence that would ensue by extracting the juice of the fibrous substance or scum and mingling it with the sugar or sirup juice in a manner to make it a part of it. The principle of operation of the defecator is not, however, claimed here, as the same constitutes the subject-matter of another division of this reissue. As soon as the green scum is thus separated, the juice flows along the bottom of the pan, and by reason of the intense heat from the fire-arch or the steam-coils the scum thereof and all remaining feculent matter are caused to flow from the most intensely heated portion of the pan to the side or sides, and as the sides are isolated in a great measure from the heat, and no ebullition takes place on or near them, the scum condenses and deposits upon them outside of the side margins of the stream of juice, the flatly-set or obtuse-angle beaches greatly facilitating the deposit of the scum, and admitting of the ready and convenient removal of the same as fast as deposited upon them. They also allow of the juices being cooked or evaporated at a very shallow depth, which is a desideratum in the process of making sugar and sirup from the sorghum or Chinese sugar-cane.

What is claimed under this patent is—

1. An evaporating-pan for sirup and sugar juices, constructed with a shallow depth by having one or both of its sides form a continuation of its bottom by rising on incline planes, substantially as set forth.

2. The combination of the pan, constructed as described, and a laterally-located defecator, substantially as set forth.

P. W. GATES.
THOS. CHALMERS.
DAVID R. FRASER.

Witnesses:
J. L. FORGO,
WILL. A. BALL.